Nov. 3, 1942.  S. W. BORDEN  2,300,770
SWING CURRENT GENERATOR
Filed Aug. 16, 1940   2 Sheets-Sheet 1

Inventor
Steffens W Borden

Nov. 3, 1942.  S. W. BORDEN  2,300,770
SWING CURRENT GENERATOR
Filed Aug. 16, 1940   2 Sheets-Sheet 2
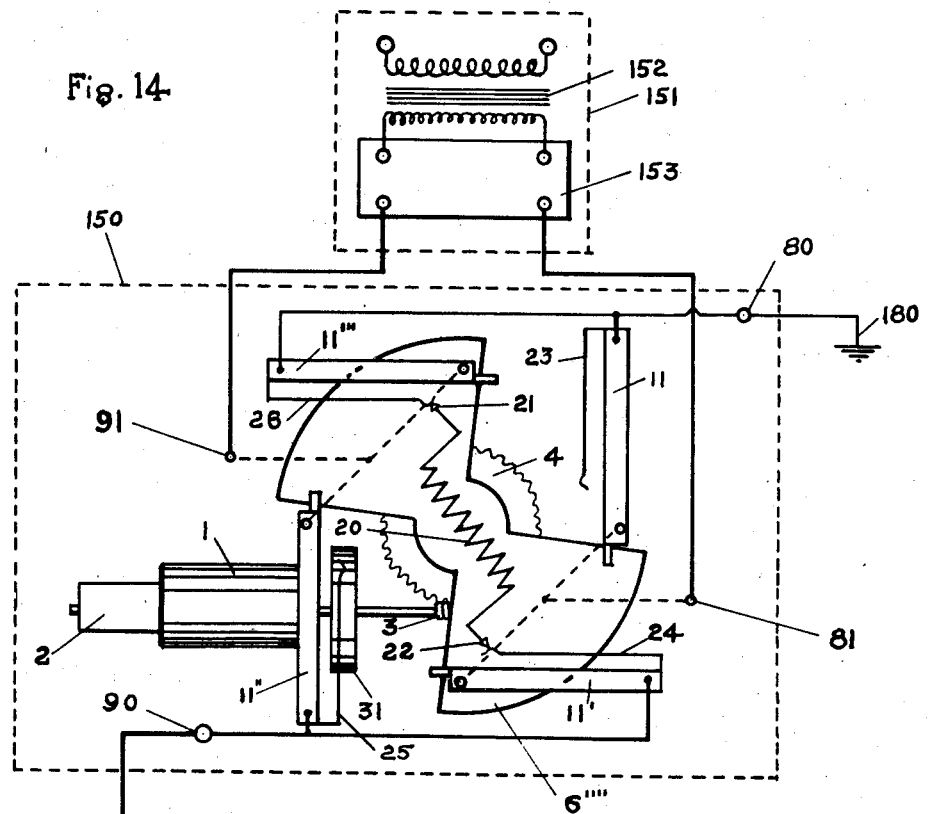
Fig. 14
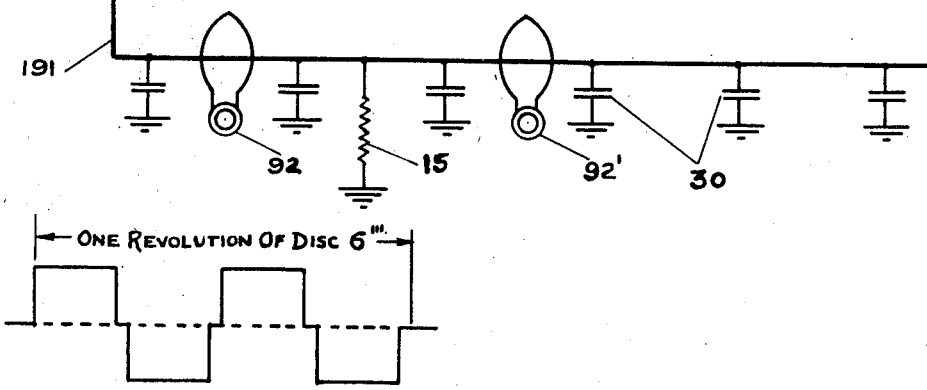
Fig. 12
Fig. 13
Steffen W. Borden, Inventor Patented Nov. 3, 1942

2,300,770

UNITED STATES PATENT OFFICE 2,300,770

SWING CURRENT GENERATOR

Stephen W. Borden, Summit, N. J.

Application August 16, 1940, Serial No. 352,939

4 Claims. (Cl. 200—30)

This invention pertains to electrical circuit controlling devices and particularly to a device for continuously making, breaking and/or changing connections in an electrical circuit or circuits for predetermined intervals and at predetermined speeds and more particularly to such a device arranged as a pole-changer for converting a source of direct current into swing current.

The term "swing current," as used in this application, is precisely defined and explained in my United States Patent #2,176,755, issued Oct. 17, 1939, and the characteristics which such a device should have will be better understood from a study of that patent.

One purpose of this invention is to provide a device which is adapted to operate as a pole-changer for converting direct current to swing current but which may be utilized also, by a mere change of connections, as a single pole single throw switch and with either one or a multiplicity of breaks in series or a multiplicity of breaks in multiple; as a single pole double throw switch with one or more breaks in series or in multiple, or as a double pole double throw switch and for other switching combinations.

Another object is to provide such a device which will successfully and continuously operate as a direct current pole-changer with a current flow of as much as 100 amperes under a pressure of 25 volts or with a current flow of 1 ampere under a pressure of as much as 2500 volts.

Another object is to provide a device having all the foregoing characteristics which is motor operated at constant speed and at any predetermined speed.

Another object is to provide a device having all the foregoing characteristics but which will be sufficiently light in weight and of sufficiently small dimensions to be easily hand-transported by a single person and to be operable from a conventional 6 volt storage battery with a current consumption, for the motor, of less than 3 amperes from said battery, these characteristics being highly desirable for such equipment when it is utilized for geophysical work in open country where no commercial source of supply is available and where transportation of equipment is frequently a major problem and also for fault location work since the presence of the fault sometimes results in no commercial supply of current being available.

Essentially the device consists of any desired number of pairs of contacts suitably mounted, all in the same plane and on the circumference of a circle, the contact mountings being such that they may be opened when desired by forcing a thin disk of insulating material between them. Mounted upon a shaft, which is placed at the center of the circle, is a disk of hard, non-combustible, insulating material, the disk being circular and composed of any desired number of sectors, the sectors being usually, but not necessarily, of the same width and all being part of a circle of sufficient diameter to extend well beyond the contacts. The disk is rotated by means of a shaft which in turn is driven by a motor through worm gearing, the motor being suitable for operation of a 6 volt direct current supply source, as well as from a commercial alternating current source, and being provided with an adjustable mechanical type governor for maintaining a desired constant speed regardless of load variations. The disk is so positioned that when the disk is rotated the segments of the disk will pass between the contacts.

In the drawings which are diagrammatic only;
Fig. 1 is a front elevation showing the motor drive and the leading edge of a segment of a disk positioned between a pair of contacts. Figs. 2, 3, 4, 5 and 6 are front elevations at right angles to the view of Fig. 1 showing the progressive positions of the contacts and disk segment as the segment is rotated in the direction of the arrow.

Figs. 12 and 13 illustrate swing currents.

Fig. 14, which is partly schematic and partly diagrammatic, represents a complete swing current generator receiving high voltage direct current and delivering swing current to a faulty conductor for testing purposes, the generator including a capacity discharge resistance.

Figure 1:
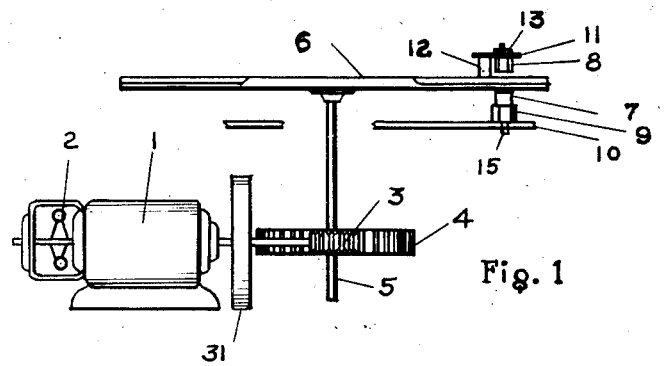
Figure 7:
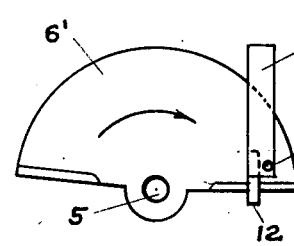
Fig. 7 illustrates a segmental disk of less than 180° and a single contact mounted above the disk, the relative positions of the disk and upper contact being substantially the same as in Fig. 5.

In Fig. 1, 1 is a motor, the speed of which is maintained constant by a mechanical governor 2 which may be adjusted to give various speeds over a range of about 20% which is usually sufficient to permit the speed of the disk to be adjusted to match the swing frequency of any particular swing current meter. The motor is connected through a worm 3 and gear 4 to shaft 5 to which is attached a disk of insulating material 6. Positioned below disk 6 and a suitable distance in from the outer extremity of the disk, is a contact 7, mounted in a holder 9, which holder preferably is screw-threaded into a member 10, preferably of conducting material. Directly above contact 7 is positioned a companion contact 8, mounted upon a metallic spring supporting member 11. Also mounted on member 11 is a shoe 12, which shoe projects slightly below contact 8. 31 is a flywheel. Fig. 7 is a plan view in which the members shown correspond to Fig. 1.

Figure 2:
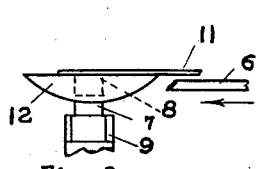
Figure 3:
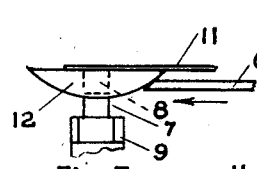
Figure 4:
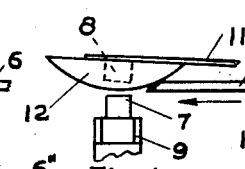
Figure 5:
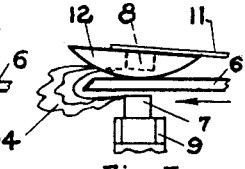
Figure 6:
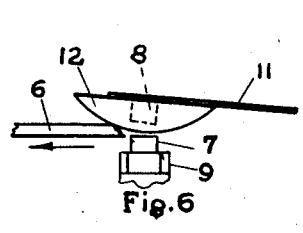

In Fig. 2 the disk 6 is approaching the shoe 12. The front edge of disk 6 is preferably bevelled as shown. The curved line of the shoe is a segment of a circle. In Fig. 3 the disk has contacted riding shoe 12 and in Fig. 4 it has forced the shoe and contact 8 upward against the tension of spring 11 and in doing so has opened the circuit between contacts 7 and 8 providing, however, that the voltage between these contacts is not sufficient to maintain an arc between them. When the circuit conditions are such as to maintain an arc between the contacts the arc will be gradually drawn, as the disk passes between the contacts, as shown at 14 in Fig. 5 and eventually the arc will be drawn out to such a length that it will break. In Fig. 6 the segment has passed the contacts and the contacts are about to close and it is to be noted that the riding shoe allows the contacts to come together gradually and without a sudden impact or blow which is detrimental to contacts of certain types and especially when being operated at very high temperatures and furthermore if they are allowed to come together with hammer blows a very undesirable amount of noise is produced by the device especially when operating a considerable number of contacts. It will be obvious that, where the electrical characteristics of the controlled circuits permit, the contact 8 and shoe 12 may be a single unitary device. For instance, contact 8 might be omitted and shoe 12 placed directly over contact 7, thereby becoming the companion contact for contact 7 as well as serving as a riding shoe.

In Fig. 7 the segment 6 is somewhat less than 180° in width and with such a disk, and a single set of contacts, the circuit will be opened and closed respectively for substantially the same length of time during each cycle as in Fig. 13 and it will be clear that as the width of this disk is increased or reduced, other things remaining equal, the circuit will be opened a relatively longer or shorter percentage of each cycle and thus by varying the width of the segment 6 the waveform of the resulting current may be varied over very wide limits.

Figure 8:
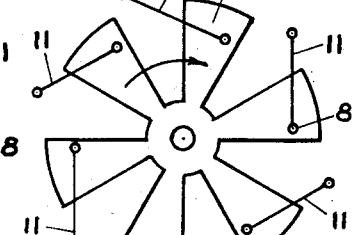
Fig. 8 shows a disk having a multiplicity of segments and pairs of contacts, the lower contacts not being shown.

Fig. 8 illustrates a disk having a multiplicity of segments and in this particular case the segments are all of the same width and the spaces between the segments are also of uniform width. With such a disk, and a single set of contacts, the circuit would be opened and closed for substantially equal periods but there would be 6 cycles per revolution of the disk instead of 1 cycle as in the case of Fig. 5 and from this it will be seen that by merely changing the disk from one type to another the frequency of the resulting current may be changed over wide limits. Of course, the frequency might also be changed by changing the speed of any given disk but as a practical matter such a change would necessitate changing the ratio of the gears 3 and 4 which is not nearly as simple as merely changing the type of disk when the device is of such design that substitutions may be easily made, but more particularly it is desirable that the speed of the disk be not changed greatly because it is desirable that the impact of the disk 6 against riding shoe 12 and the speed with which the upper contact is raised and lowered should not be greatly changed, because the speed itself is an important element in the design of these members and also of the spring member 11.

It will be clear from the foregoing that by using disks of various forms, with respect to the number and width and positioning of the segments of the disks, a resulting current may be obtained which may have various waveforms and frequencies and without making any changes which might change either the electrical or mechanical operating characteristics of the disk with respect to its function of opening and closing the contacts.

It will be noted that the contacts themselves do not come into contact with the disk and that the only friction tending to retard the movement of the disk is that of the riding shoe 12 on the disk and also that there is no mechanical pounding of the contacts together as they close nor any mechanical pounding of the contacts by the disk 6 both of which are important characteristics where composition carbon contacts are employed or where contacts are operated at temperatures sufficiently high to make them more or less malleable. Both the disk 6 and the riding shoe 12 should be composed of relatively hard material which will be practically free from wear. The disk 6 must be composed of highly insulating material, because the device is intended for use where the voltage across the disk may be several thousand volts and furthermore the disk must obviously have considerable mechanical strength and it must furthermore be able to stand, without cracking or serious burning, the effects of drawing around its edge an arc of considerable heat and power as illustrated in Fig. 5. It is desirable also that the disk be relatively thin, preferably not over ⅛ inch, in a device such as that of Fig. 14 and should be of a material to which lubricants may be applied without detriment. I have found that a suitable disk may be constructed from the insulating material known as "Mycalex."

With respect to the contacts 7 and 8, I prefer to make the contact 7 from hexagon rod, ⅜ inch in diameter, of a silver graphite composition known by the trade name of Graphalloy. This contact is forced into a hexagon brass holder 9 which has a threaded stud 15 on its lower end which may be conveniently threaded into the conducting member 10. The companion contact 8 may be made from a piece of ⅜ inch diameter hexagon copper rod which also is formed with a threaded stud and may be secured to spring member 11 as by means of a nut 13. I have found that such a pair of contacts will successfully carry continuously and make and break a direct current of 100 amperes under a voltage as high as 25 volts. When these contacts are used for breaking a direct current of ½ ampere under a pressure of 5000 volts, which results in drawing out an arc such as shown at 14 in Fig. 5, the burning from the arc is confined to the very edge of the contacts 7 and 8 and this burning does not interfere with the closed circuit functions of the contacts and it is to be noted that it is by virtue of the fact that the disk 6 moves forward and between the contacts that the arc is drawn on the very edge of the contacts and not on the current carrying surfaces and the arc does not spread to the shoe because of the lateral spacing between the shoe and the contact. It is also to be noted that these contacts may be very easily renewed and they are comparatively inexpensive.

It will be clear that since disk 6 continues to move, the circuit will eventually be interrupted if the device be designed for the voltage involved and if, in case of excessive current flow, the contacts should tend to weld or stick together the full power of the motor, together with the power derived from the momentum of the moving parts, is available to break the weld and open the circuit and this power may be greatly enhanced, if desired, by the addition of a flywheel to some of the rotating parts as, for instance, to the motor shaft as shown at 31 in Fig. 1.

Figure 11:
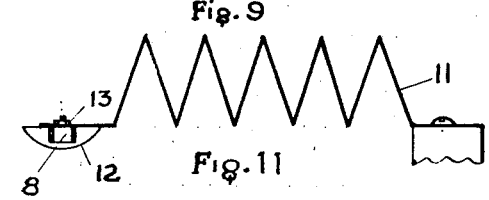
Fig. 11 is a detailed view of the construction of the spring contact supporting member 11.

In order that the contacts of the character previously mentioned may function as described it is necessary that the contacts be under considerable pressure when they are carrying heavy currents, not only because of the necessity of limiting the heating effects but because it is desirable also to limit the voltage drop when the device is used for supplying swing current for making bridge measurements on heavy cables. If the length of spring 11, from the point of permanent attachment to the center of contact 8 is say, 3 inches, I have found that when the contacts are fully separated by disk 6 the pressure of the shoe 12 against the disk is considerable and it is desirable that this pressure be as low as possible both because of the wear and also because of the power required for operating the device and in order to reduce the increase in pressure produced when the contacts are separated, without lengthening the distance between the point of attachment and the point of contact, I construct this spring as shown in Fig. 11. When the spring is flat it is approximately 9 inches long and it is folded up in accordion fashion, as shown, in approximately 5 folds to reduce the length to 3 inches. When a spring is thus formed the increase in pressure, for a given separation of the contacts, is substantially the same as would be obtained with a flat spring 9 inches long.

Figure 9:
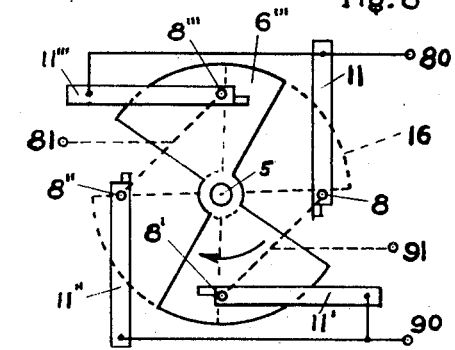
Fig. 9 illustrates the relative positions of the contacts and disk and the connections between contacts when the device is equipped with a two-segment disk and is to be used as a pole-changer or swing current generator.

Referring now to Fig. 9. Here the device is provided with a two-segment disk, each segment of which is approximately 85° in width. The device is equipped with four sets of contacts, the upper contacts 8, 8', 8'' and 8''' of each set being attached to the spring members 11, 11', 11'' and 11''' respectively, the contacts being spaced on a circle having the same center as the driving shaft 5 and being spaced 90° apart. Contacts 8 and 8''' are connected together and to a terminal 80 while contacts 8' and 8'' are connected together and to a terminal 90. A companion contact 7 (not shown) for contact 8 is connected to a companion contact 7' (not shown) and the two are connected to a terminal 91 while the companion contact 7'' (not shown) is connected to a companion contact 7''' (not shown) and the two are connected together and to a terminal 81, all as shown in the simplified wiring diagram of Fig. 10. In the position shown contacts 7—8 and contacts 7''—8'' are closed and the other contacts are open. As the disk revolves in the direction shown by the arrow it eventually reaches a position as shown by the dotted figure 16 and it will be clear from an inspection of Figs. 4 and 6 that all of the contacts are now open. As the disk progresses further, contacts 8'—8''' are dropped by the disk into contact with their companions and the circuit is again re-established, but the polarity on the terminals 80 and 90 is now reversed. The length of time that the circuit is held entirely opened depends upon the width of the segments of disk 6''' and this open period must be long enough to provide for the circuit being entirely opened on one side, including the breaking of any arc such as 14 in Fig. 5, before the circuit is closed on the other side and the minimum width of segment 6''' is therefore determined, among other things, by the length of the arc which may be drawn when the disk is operating under the maximum voltage conditions for which it is designed.

With a disk and contact arrangement substantially as shown in Fig. 9 and with a direct current potential applied to posts 81 and 91, the resulting potential between posts 80 and 90 will be a block type of alternating swing current substantially as shown in Fig. 12, and having a frequency of 1.2 cycles per second, providing the disk is operating at 36 revolutions per minute. If we remove contacts 7—8 and 7''—8'' the result is a pulsating swing current of the same frequency.

In Fig. 14 I have shown diagrammatically a substantially complete swing current generator within the dotted enclosure 150, the generator being provided with two terminals 81 and 91 for connection to a source of direct current, which may be of either high or low voltage. When the generator is used for supplying tracer current to a faulty conductor it is usually necessary to have a high voltage source and I have therefore shown within the enclosure 151 a direct current power pack consisting of a stepup transformer 152 and a rectifier 153. Terminal 80 is shown connected to ground by conductor 189 and terminal 90 is connected to a defective conductor 191, the electrostatic capacity of which is indicated by condensers, as 30, evenly distributed along the conductor. Direct current from source 151 is changed by the swing current generator into alternating swing current which flows through conductor 191 and the fault 15 to ground and thence back through the ground and conductor 181 to terminal 80. A suitable swing current detector device is indicated at 92 and at 92', and when placed ahead of the fault, as is 92, it will detect the presence of swing current in conductor 191 but when the fault has been passed, as in position 92', the presence of the swing current will no longer be indicated. A suitable swing current detector device is described in detail in my United States Patents #2,176,756 and #2,176,757.

Figure 10:
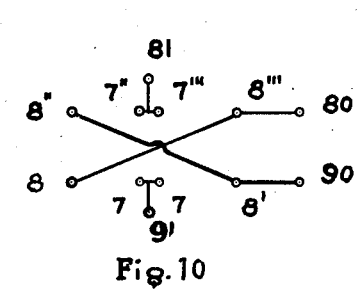
Fig. 10 is a simplified wiring diagrm corresponding to Fig. 9.

The description of the disk and contacts and the general operation of the device as given in connection with Figs. 9 and 10 apply to the device of Fig. 14 but in addition there has been added a discharge resistance 20. This resistance is mounted upon the disk 6'''' and revolves with it and is provided with two rigid contact terminals 21 and 22. Stationary spring members 23, 24, 25 and 26 are attached to spring members 11, 11', 11'' and 11''' respectively. As the disk rotates the member 21 contacts spring contact 26 when the member 22 contacts spring 24 and 21 contacts 23 when 22 contacts 25 with the result that the resistance 20 is connected directly across the terminals 80 and 90 but this connection is made only during the period when all other contacts are open. The purpose of this discharge resistor is to discharge the electrostatic capacity of the circuit connected between terminals 80 and 90, during the period when the terminals are not connected to the source of swing current, for the purpose of reducing the maximum charging current which may flow and for preventing the building up of excessive voltage between terminals 80 and 90 due to the electrostatic capacity of conductor 91. The construction and function of this discharge resistor 20 is more fully set forth in my copending application Serial No. 352,940, filed concurrently with this application.

One of the objects of this invention, as previously stated, is to produce a device which is relatively small and light and therefore easily transportable and I have therefore defined the dimensions of some of the parts and it may be further said that in the device of Fig. 14 the disk 6 has a diameter of 6½ inches, the contact supporting spring 11 is but 3 inches long from the point of support to the contact. The entire device, within the dotted enclosure 150, and which device of course includes everything shown in Fig. 1, when placed within a metal housing 12 inches by 8 inches by 9 inches weighs less than 20 pounds. It is thought important to point out the approximate size and weight of this equipment because other equipment is known in the art which, when built on a sufficiently large scale might be made to function substantially as does this device, but such prior art devices require vastly more power for their operation and are necessarily very much larger and heavier because of the general design involved and this is especially true if so designed as to have the great range of current carrying capacity at low voltage and the high voltage breaking capacity at low current flow which are inherent in the design of my device nor is it possible, in prior art devices, to modify the waveform and/or the frequency of the resulting current by merely changing a single element such as applicant's interrupter disk.

What I claim is:

1. A device for interrupting an electric circuit which includes a pair of companion contacts connected in the circuit and normally held together, one of said contacts being stationary and one being movable, to permit separation of the contacts; a riding shoe having a flat portion attached to the movable contact and a riding portion, formed in the arc of a circle, extending beyond the contact in a direction toward the stationary contact; a relatively thin circular disk of hard, non-combustible, insulating material from which one or more portions have been removed; a driving shaft attached at the center of the disk and at right angles thereto for rotating the same; the disk being positioned at right angles to the line of movement of the contacts at the moment of separation and so that a portion of the disk substantially removed from its outer edge may lie between the two contacts when they are separated, with one surface of the disk adjacent to but not touching the stationary contact and the other surface in contact with the riding shoe and adjacent to but not touching the movable contact; and means for continuously revolving the driving shaft for repetitively passing a portion of the insulating disk between the contacts while permitting the contacts to close for periods corresponding to the removed portions of the disk.

2. A device for interrupting an electric circuit which includes a pair of companion contacts connected in the circuit, at least one of said contacts being normally pressed against its companion contact by means of a spring member constructed from flat spring material, the spring member being rigidly anchored at one end and having the movable contact attached thereto at its opposite end, the flat spring member being formed with a multiplicity of accordion type folds or pleats extending substantially at right angles to the line connecting the point of anchorage with the point of attachment to the contact, whereby the airline distance between the said two points is greatly reduced as compared to the airline distance without said pleated construction, the said contact being attached to the spring and movable in a direction opposing the spring tension to permit separation of the contacts; a relatively thin disk of hard, non-combustible, insulating material formed from a circular sheet of material from which one or more portions have been removed; a driving shaft attached at the center of the disk and at right angles thereto for rotating the same; the disk being positioned at right angles to the line of movement of the contacts at the moment of separation and so that a portion of the disk substantially removed from its outer edge may lie between the two contacts when they are separated; and means for continuously revolving the driving shaft for repetitively passing a portion of the insulating disk between the contacts while permitting the contacts to close for periods corresponding to the removed portions of the disk and the contacts being so positioned that when the leading edge of a portion of the disk is between the contacts the direction of movement of the edge is substantially that of a line connecting the center of the contact with the point of suspension.

3. A device for continuously, repetitively and simultaneously interrupting and restoring a multiplicity of independent electrical circuits which includes a pair of companion contacts connected in each of the circuits and normally held together, each pair consisting of a first and a second contact the second contact being fixed to one end of a contact supporting member which tends to hold the contacts together said member being secured in place at its far end but left free to move at the contact end in a direction to separate the contacts; a relatively thin disk of hard, non-combustible, insulating material formed from a circular sheet from which the outer portion of a multiplicity of radial segments has been removed, the remaining segments of the disk being equally spaced from each other and all encompassing a like number of degrees and each of said segments being positioned diametrically opposite another similar segment: a driving shaft attached at the center of the disk and at right angles thereto for rotating the same and associated means for revolving the shaft, the disk being positioned at right angles to the line of movement of the contacts at the moment of separation and so that a portion of each remaining segment, substantially removed from its outer edge, will pass between a pair of contacts when they are separated but without touching either contact; together with a disk riding member attached to each of the contact supporting members at a point near the contact and extending beyond the contact to engage and ride upon the surface of an advancing segment of the disk a portion of which is about to pass between the contacts, for holding the contacts apart while a portion of the segment passes between them.

4. A device for periodically and repetitively opening and closing an electric circuit which includes a first and second contact connected in the circuit, the second contact being fixed to one end of a contact supporting member which tends to hold the contacts together said member being secured in place at its far end but left free to move at the contact end in a direction to separate the contacts; a relatively thin, circular disk of hard, non-combustible insulating material from which the outer portions of one or more segments have been removed; a driving shaft attached at the center of the disk and at right angles thereto for revolving the same and associated means for continuously revolving the shaft, the disk being positioned at right angles to the line of movement of the contacts at the moment of separation and so that a portion of the disk, substantially removed from its outer edge, will pass between the two contacts when they are separated but without touching either contact; together with a disk riding member attached to the contact supporting member near the contact and extending beyond the contact to engage and ride upon the surface of an advancing portion of the disk a part of which is about to pass between the contacts, for holding the contacts apart while a part of the disk passes between them.

STEPHEN W. BORDEN.